US007650469B2

(12) United States Patent
Dyck et al.

(10) Patent No.: US 7,650,469 B2
(45) Date of Patent: Jan. 19, 2010

(54) DETERMINING WHETHER A NON-RUNNING PROCESSOR HAS ACCESS TO AN ADDRESS SPACE

(75) Inventors: Greg A. Dyck, Morgan Hill, CA (US); Charles W. Gainey, Poughkeepsie, NY (US); Jeffrey P. Kubala, Poughquag, NY (US); James H. Mulder, Wappingers Falls, NY (US); Damian L. Osisek, Vestal, NY (US); Robert R. Rogers, Beacon, NY (US); Mark A. Wisniewski, Wappingers Falls, NY (US); Leslie W. Wyman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/470,468

(22) Filed: Sep. 6, 2006

(65) Prior Publication Data

US 2008/0059719 A1 Mar. 6, 2008

(51) Int. Cl.
*G06F 13/00* (2006.01)
(52) U.S. Cl. .................. 711/152; 711/158; 711/209
(58) Field of Classification Search ............. 711/152, 711/158, 209
See application file for complete search history.

(56) References Cited

U.S. PATENT DOCUMENTS

| | | | | |
|---|---|---|---|---|
| 4,494,189 A * | 1/1985 | Bean et al. | ............... | 718/107 |
| 4,843,541 A | 6/1989 | Bean et al. | ............... | 710/36 |
| 5,499,354 A | 3/1996 | Aschoff et al. | ............... | 711/129 |
| 5,530,897 A | 6/1996 | Meritt | ............... | 710/9 |
| 6,058,414 A | 5/2000 | Manikundalam et al. | ............... | 718/104 |
| 6,157,965 A | 12/2000 | Mohammed et al. | ............... | 710/8 |
| 6,370,641 B1 | 4/2002 | Maia | ............... | 713/1 |
| 6,757,843 B1 | 6/2004 | Wesley et al. | ............... | 714/18 |

(Continued)

FOREIGN PATENT DOCUMENTS

EP 301275 A 2/1989

OTHER PUBLICATIONS

Waldspurger: C A: "Memory resource management in VMware ESX Server" Proceedings of the Usenix Symposium on Operating Systems Design and Implementation, XX, XX, 2002, pp. 181-194, XP002341378 abstract p. 182, left-hand column, paragraph 2.- p. 184, right-hand column, paragraph 4. p. 187, right-hand column, paragraph 5.—p. 189, right-hand column, paragraph 5.4 p. 190, left-hand column, paragraph 6- p. 192, left-hand column, paragraph 7.

(Continued)

*Primary Examiner*—Reba I Elmore
(74) *Attorney, Agent, or Firm*—John E. Campbell; Daryl Neff (57) ABSTRACT

A method is provided for determining whether a logical processor of an information processing system has access to an address space of the information processing system. An instruction is issued by a first processor, the instruction referencing a target logical processor and a target address space. In response to the instruction, first information is checked to determine whether the target logical processor is running. When it is determined that the target logical processor is not running, second information is checked by a host program to determine whether the target logical processor has access to the target address space.

17 Claims, 4 Drawing Sheets

U.S. PATENT DOCUMENTS

| | | | |
|---|---|---|---|
| 2002/0010844 A1 | 1/2002 | Noel et al. | 711/153 |
| 2004/0083481 A1 | 4/2004 | Shulz | |
| 2005/0273602 A1* | 12/2005 | Wilson et al. | 713/164 |
| 2005/0278722 A1 | 12/2005 | Armstrong et al. | |
| 2006/0064692 A1* | 3/2006 | Sanchez et al. | 718/100 |
| 2006/0161421 A1* | 7/2006 | Kissell | 703/26 |
| 2006/0242461 A1* | 10/2006 | Kondo et al. | 714/21 |

OTHER PUBLICATIONS

Barham P et al: "Xen and the Art of Vitrualization" Proceedings of the ACM Symposium on Operating Systems Principles, XX, XX, Oct. 2003, pp. 164-177, XP002298786 abstract p. 166, left-hand column, paragraph 2.1.1—right-hand column, paragraph 2.1.2 p. 167, left-hand column, line 4-line 11 p. 169, right-hand column, paragraph 3.3.3—p. 170, left-hand column, last line.

International Search Report PCT/EP2007/058431 International Filing Date Aug. 15, 2007.

"A Tool for Binding Threads to Processors"; Broberg, Lundberg and Grahn; Euro-Par Conference - 2001.

N. L. Springen, "Method to Dynamically Bind Device Drivers," IBM Technical Disclosure Bulletin, vol. 28, No. 2, Jul. 1985, p. 617.

* cited by examiner

DETERMINING WHETHER A NON-RUNNING PROCESSOR HAS ACCESS TO AN ADDRESS SPACE

BACKGROUND OF THE INVENTION

The present invention relates to multi-processor information processing systems.

Modern computing systems, including multi-processor information processing systems, have the ability to allocate regions of memory in terms of "address spaces" which are defined by the addresses used to access them. When the programs being executed by a computing system changes, an address space can be re-allocated from use by one program, e.g., an application program, to another program, which may be another application program or other program. This application relates to a method and system for use in such situations.

SUMMARY OF THE INVENTION

A method is provided in accordance with an aspect of the invention for determining whether a logical processor of an information processing system has access to an address space of the information processing system. An instruction is issued by a first processor, the instruction referencing a target logical processor and a target address space. In response to the instruction, first information is checked to determine whether the target logical processor is running. When it is determined that the target logical processor is not running, second information is checked by a host program to determine whether the target logical processor has access to the target address space.

DETAILED DESCRIPTION

Figure 1:
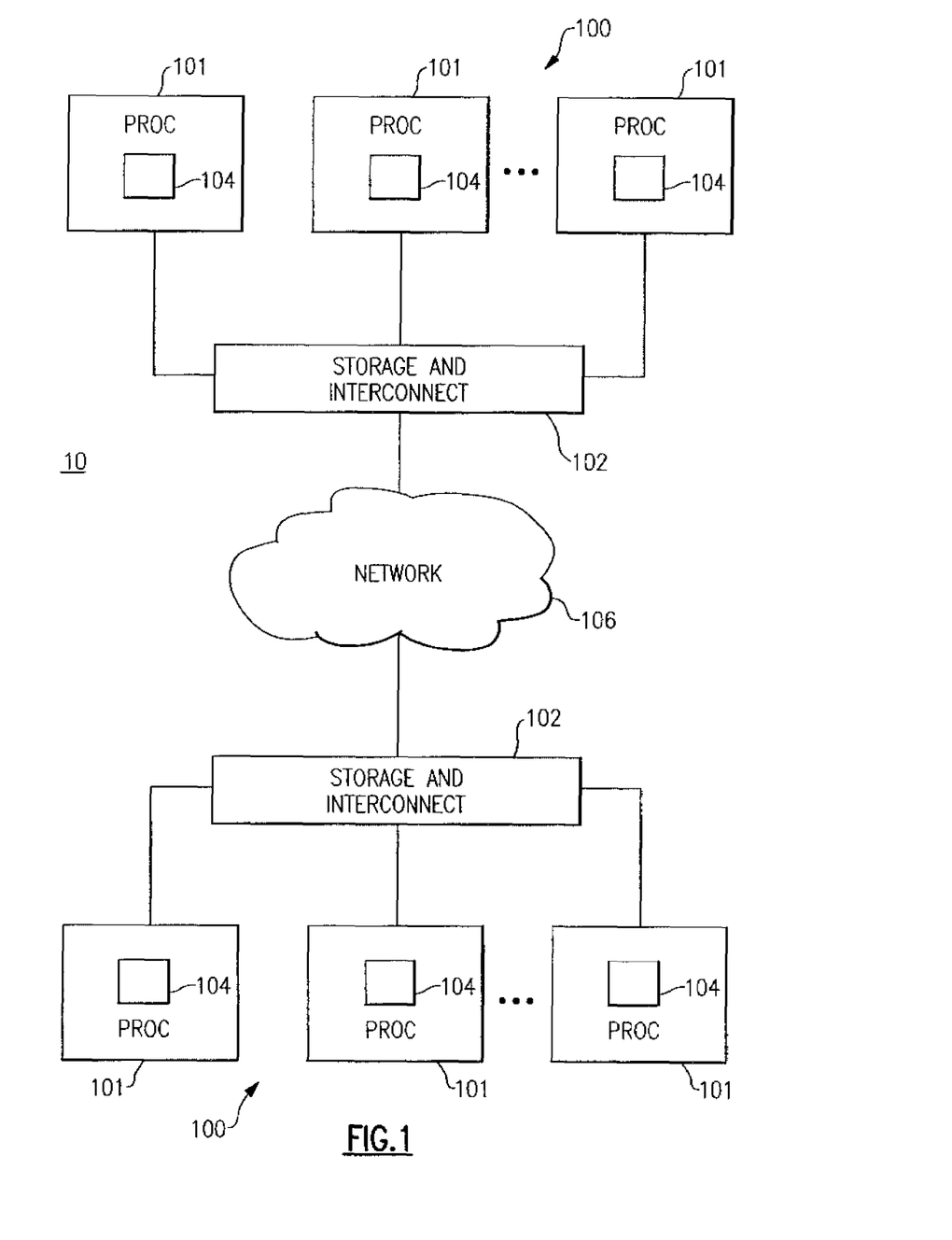
FIG. 1 is a block diagram illustrating an exemplary computing environment which supports use of the method and system in accordance with the embodiments of the invention.

FIG. 1 illustrates a computing environment 10 which supports the performance of a method in accordance with an embodiment of the invention. In the computing environment illustrated in FIG. 1, a multi-processor system 100 includes a plurality of physical processors 101 linked together via a common storage and interconnect subsystem 102, as shown in the upper half of FIG. 1. The term "physical processor" denotes the hardware together with microcode, firmware and lowest level processing software for enabling the physical processor to support the operation of an operating system and processes subject to its control. While the multi-processor system is illustrated with only three physical processors, it is possible for the multi-processor system to have fewer or a greater number of physical processors. The storage and interconnect subsystem 102 contains certain storage and communication resources which are subject to being shared among the physical processors. Typically, each physical processor also possesses processor-specific resources such as processor storage 104 or communication resources that are possessed exclusively by the physical processor. Sometimes, only certain reconfigurable portions of the processor storage 104 are possessed exclusively by a particular physical processor, while other reconfigurable portions are designated for the exclusive use of another one of the physical processors. The allocation of such processor storage 104 and portions of common storage within the storage and interconnect subsystem 102 is performed for a variety of goats such as performance, reliability and security.

As further shown in FIG. 1, the computing environment 10 includes a second multi-processor system 100, illustrated in the lower half of FIG. 1, the second multi-processor system 100 including physical processors 101 and a storage and interconnect subsystem 102 which, desirably are similar to those of the above-described multi-processor system, but which need not be the same. A network 106, e.g., one which can operate with a high data transmission rate or otherwise, supports the transmission of data between the two multi-processor systems 100, as well as control messages which facilitate or manage such data transmission. In one example, the two multi-processor systems can operate as loosely-coupled systems, each of which executes an independent process, but in which data and/or instructions, such as, for example, "applets" are distributed on an ad hoc basis or occasionally between the two multi-processor systems. In another example, the two multi-processor systems can operate as tightly-coupled systems in which data and/or instructions are exchanged frequently, such as for parallel processing of a task having a large computing volume.

Figure 2:
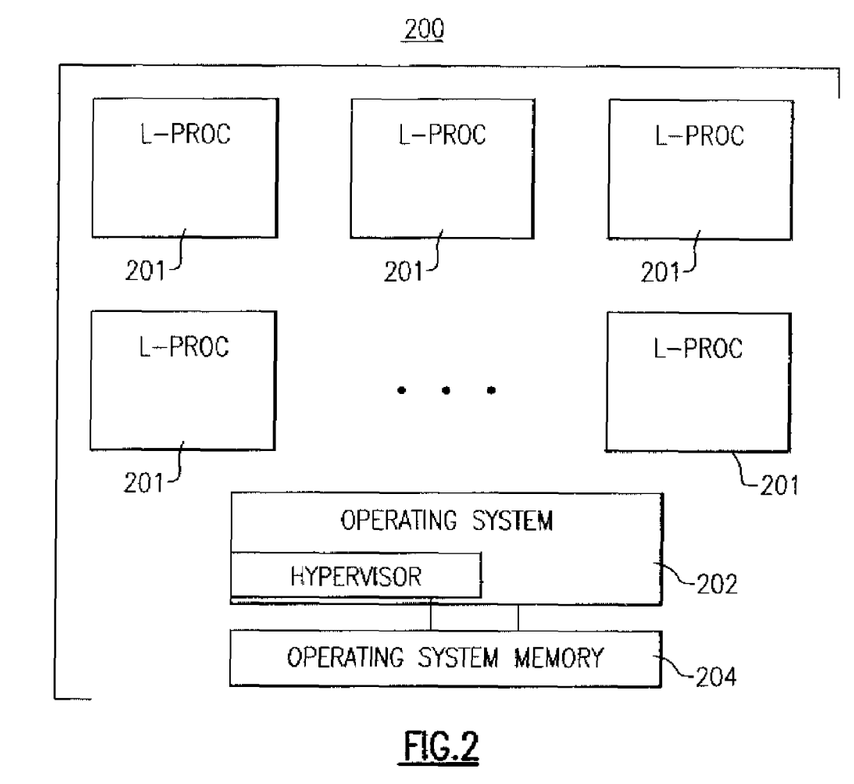
FIG. 2 is a block diagram illustrating a system configuration in accordance with one embodiment of the invention.

FIG. 2 is a diagram illustrating one exemplary information processing system 200, which can be supported by the multi-processor system 100 as illustrated and described above with reference to FIG. 1. As illustrated therein, the information processing system 200 includes a plurality of logical processors 201, each of which, when "running", is capable of executing instructions of a program to carry out a process. The operating system 202 allocates and maintains state variables for permitting each logical processor to execute a program when such logical processor is running. Typically, each logical processor executes instructions on a physical processor during execution intervals allocated thereto by an operating system or "host program" which supervises the use of resources by that logical processor. At the end of an allocated execution interval, each logical processor returns the results of execution to storage or in form or updated state variables to the host program.

Logical processors, while being granted privileges to define and alter state variables relating to certain processes they execute, are precluded from granting or altering other state variables which have a more global effect and are precluded from allocating certain other resources on their own. For this reason, the logical processors are deemed to execute a process which has only ordinary privileges. On the other hand, the operating system, having greater privileges, executes a process for granting or altering the more global state variables and other resources. Typically, the operating system 202 stores and accesses the state variables, stores and accesses program status words, as well as register states in a reserved section of memory known as an operating system memory 204. In a so-called "native" mode of operation, the operating system controls the allocation and management of all the resources of the multi-processor system including operating system memory 204, shared system memory contained in the storage and interconnect subsystem 102 and, in some cases, processor storage 104, as well.

However, modern multi-processor systems permit multiple different operating systems and multiple images of the same operating system to run simultaneously, in a mode of operation known as logically partitioned ("LPAR") mode. In LPAR mode, a super-privileged program known as a host program has even greater privileges than an operating system. The super-privileged host program controls the allocation of resources to the multiple operating systems and multiple operating system images such that each operating system and operating system image obtains needed resources without conflict. Host program memory resources needed to store state variables are among those allocated to the operating systems and operating system images by the host program.

Figure 3:
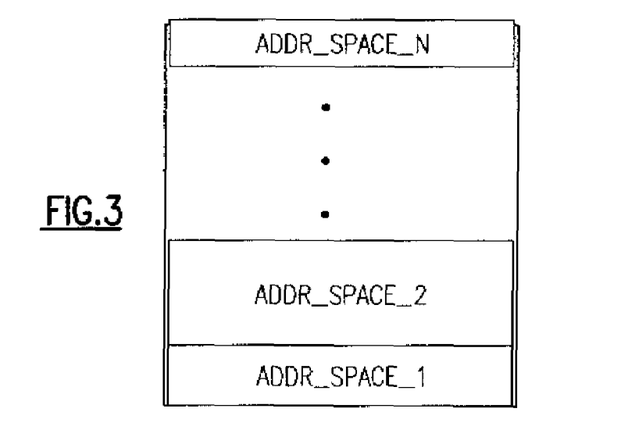
FIG. 3 is a diagram illustrating an address space allocation of memory in connection with an embodiment of the invention.

Whether in native mode or LPAR mode, the operating system manages access to certain ranges of memory for use in executing application programs by the logical processors. Such ranges of memory are typically managed, not strictly on terms of their actual physical location in processor storage, shared storage or operating system memory, but rather by the addresses used to access such ranges. Thus, a range of addresses in memory defines an "address space", regardless of its actual physical location. For example, as illustrated in FIG. 3, an operating system's total address space can include a set of smaller reconfigurable address spaces ADDR_SPACE_1, ADDR_SPACE_2 through ADDR_SPACE_N. Each of the address spaces typically is assigned to the performance of a task, or for executing an application program which includes certain defined tasks. The size and position of each address space within the total address space can vary from time to time during execution of the operating system and the application programs it supports.

In a particular application program, the operating system can assign a plurality of logical processors to execute tasks in support of one or more processes of the application program. To control the use of storage, a certain target address space, e.g., ADDR_SPACE_2, is allocated by the operating system for the storage of data and/or instructions. In this way, the address space can be allocated for use as a region of memory usable by each logical processor that executes tasks for the particular application program.

However, a point in time is reached when the application program no longer needs the address space or the operating system needs to allocate the address space to a different process. In such case, the de-allocated address space is reclaimed by the operating system from the set of logical processors to which it was formerly allocated. At such time, all logical processors which formerly had access to the address space are required to relinquish their access.

In an embodiment of the invention, an efficient way is provided for determining whether a logical processor has access to a particular address space. The particular logical processor whose status is to be checked can be referred to as a "target logical processor," and the particular address space to be checked can be referred to as a "target address space." Unlike the method described above as background to the present invention, it is not necessary for a target logical processor to be running, that is, be in interpretive execution mode in order for a host program to determine whether the target logical processor has access to the target address space. When at a particular point in time the host program determines that the target logical processor is not running, the host program references stored host program information which allows it to efficiently determine whether the target logical processor has access to the target address space. When in such case, the host program determines that a non-running target logical processor does not have access to the target address space, this eliminates the inefficiency of having to wake the target logical processor for the purpose of commanding such target logical processor (unnecessarily) to relinquish access to the target address space.

Figure 4:
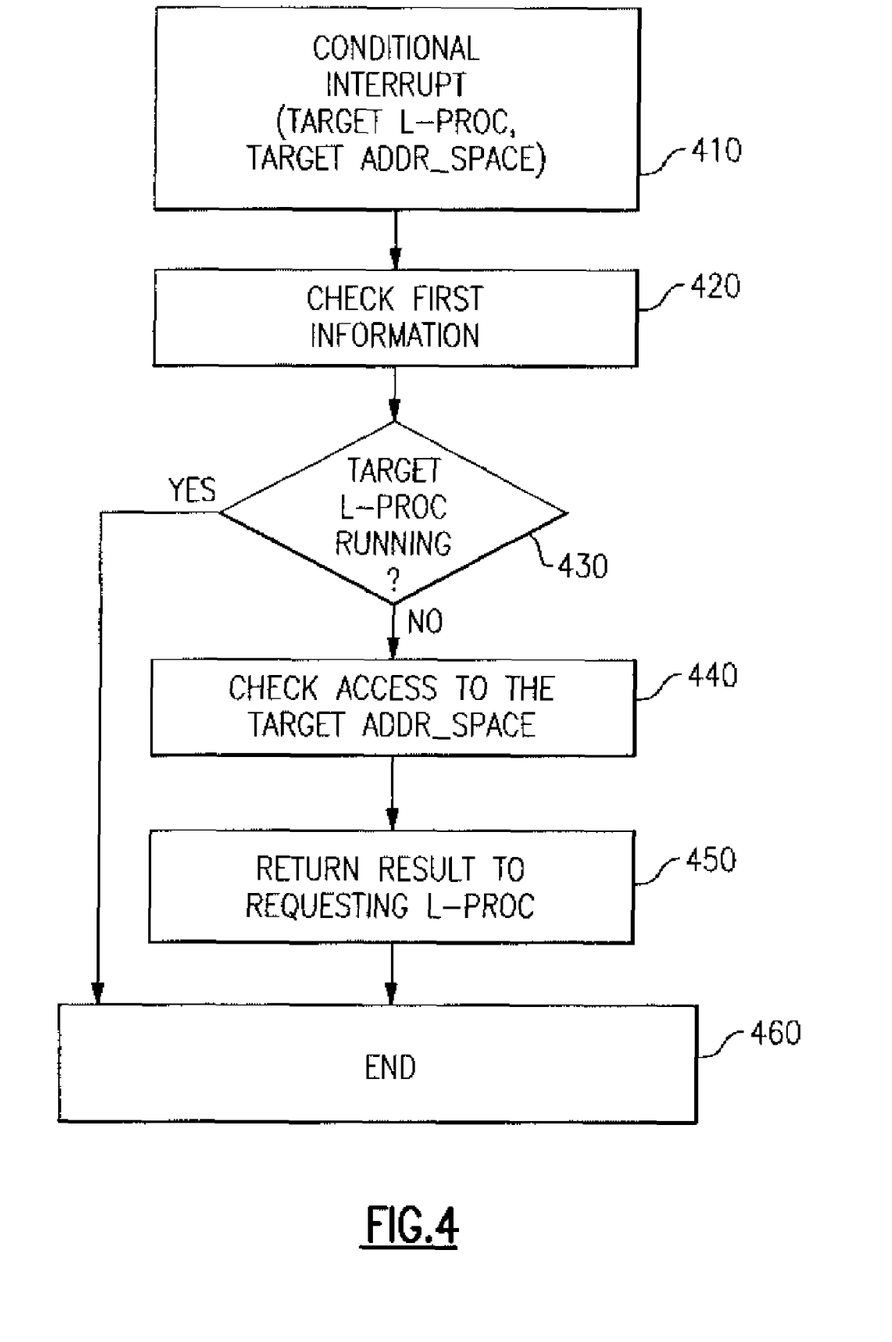
FIG. 4 is a flowchart illustrating a method of determining whether a logical processor has access to a target address space in accordance with an embodiment of the invention.

A more specific implementation of this method will be described now with reference to FIG. 4. A requesting logical processor functions as a control processor for a multiprocessor operating system image. A decision is made to de-allocate a target address space. This might occur, for example, when an application program is being closed, or when high priority work arrives that requires immediate attention and part or all of the target address space is needed for the high priority work. At such time, the control processor, referred to as a "requesting logical processor," issues an instruction that references a target logical processor and a target address space (step 410). The instruction preferably is in form of a request to issue a conditional interrupt "emergency" signal that is directed to a particular target logical processor. The issuance of the instruction by the requesting logical processor causes a transfer of control to the host program. As a super-privileged program, the host program performs initial handling of the conditional interrupt instruction. As a conditional interrupt instruction, an interrupt is presented for handling by the target logical processor only when a certain condition occurs, i.e., when the conditional interrupt instruction cannot be handled completely by the host program. In particular cases, the host program is able to completely handle the conditional interrupt instruction. In those particular cases the host program itself determines that the target logical processor does not have access to the target address space and, therefore, the host program reports that fact back to the requesting processor.

In other cases, the host program may determine that the target logical processor does have access to the target address space. Alternatively, the host program can determine by checking certain information that it is unable to detect whether the target logical processor has access to the target address space. In those other cases, the host program is not able to completely handle the conditional interrupt instruction, and therefore posts an interrupt for handling by the target logical processor.

Thus, the host program always intercepts the conditional interrupt emergency signal instruction for initial handling. As indicated at step 420, the host program checks first information to determine whether or not the target logical processor is currently running. When in step 430 the host program determines that the target logical processor is not running, the host program checks second information (step 440) to determine whether the target logical processor has access to the target address space. For example, the host program determines whether the target address space number referenced by the command equals an address space number ("ASN") value assigned to the target logical processor and returns a result preferably in form of a code indicating the status to the requesting logical processor, as indicated at step 450. If, when checking the second information, the host program determines that the target logical processor does not have access to the target address space, in step 450 the host program signals a response code of "one" back to the requesting processor to indicate that the target logical processor does not have access. The host program has now handled the conditional interrupt emergency signal instruction completely. Thus, the handling of the conditional interrupt instruction is at an end in step 460.

When the host program determines that the target logical processor is not running, the host program also checks (in step 440) whether the target logical processor is in a stopped state or a wait state. When the target logical processor is in a stopped state or wait state, the target logical processor could become running again and acquire access to the target address space. Under such condition, the host program cannot reliably determine whether the target logical processor has access to the target address space. Therefore, upon determining that the target logical processor is in a stopped state or wait state, the host program posts the interrupt to the target logical processor. The host program then also signals a response code of "zero" back to the requesting logical processor to indicate that the requesting logical processor should await response from the target logical processor.

When checking the second information, the host program may also check to determine whether a program status word ("PSW") is disabled for external interruptions or is disabled for input output (I/O) system interruptions. When either condition or both such conditions are true, the host program determines that it cannot reliably detect whether the target logical processor does not currently access or will not shortly access the target address space. In that case also, the host program posts the interrupt to the target logical processor. The host program then also signals a response code of "zero" back to the requesting logical processor to indicate that the requesting logical processor should await response from the target logical processor.

In another case, when checking the second information, the host program also checks to determine whether the target logical processor is in a wait state and the instruction address in the PSW is not zero. When this condition is true, the host program also determines that it cannot reliably detect whether the target logical processor does not currently access or will not access the target address space shortly. In that case also, the host program posts the interrupt to the target logical processor. The host program then also signals a response code of "zero" back to the requesting logical processor to indicate that the requesting logical processor should await response from the target logical processor.

On the other hand, when in step 430 the host program determines that the target logical processor is running, the host program cannot handle the instruction completely by itself. In that case, the host program posts an interrupt to the target logical processor for further handling by the target logical processor, and the host program signals a response code of "zero" back to the requesting logical processor to indicate that an interrupt to the target logical processor is pending. The direct handling of the conditional instruction by the host program is then completed (step 460). The interrupt order is then held for handling by the target logical processor in the same way as if it were an unconditional emergency signal interrupt. In certain computing system configurations, a relatively large number of logical processors can be utilized. Through use of a conditional interrupt-emergency signal as in the above-described method, the running status of many, if not most of the logical processors in the configuration can be determined by the host program. The host program can then go on to determine the set of logical processors which do not have access to a target address space, without requiring each logical processor to enter interpretive execution mode to make such determination. In this way, time-consuming steps required for loading registers to permit each logical processor to enter interpretive execution mode are made unnecessary, and thus avoided. An increase in system throughput is realized through the performance of this method.

An extension of the above-described method will now be described with reference to FIG. 5. Steps 510 through 550 (FIG. 5) are the same as the steps 410 through 450, respectively (FIG. 4), except that in step 510, the requesting processor issues a conditional interrupt instruction for each logical processor of a plurality of logical processors, for example, for each logical processor of the system configuration. Each such conditional interrupt preferably is processed individually by the host program by performing the steps 510 through 550.

In step 580, each logical processor that is determined to have access to the target address space and which is not running (not in interpretive execution mode), such logical processor is awakened (caused to become running, i.e., placed in interpretive execution mode) by the host program and caused to cancel, i.e., relinquish its access to the target address space. These actions occur in response to the host program posting an interrupt to the target logical processor referenced in the conditional interrupt emergency signal instruction and awakening the target logical processor to the running state. When each such target logical processor to which an interrupt is posted becomes running again, that target logical processor relinquishes its access to the target address space, signals back to the requesting logical processor that it has left the target address space.

In the case where the host program determines that a particular logical processor is "running," i.e., in interpretive execution mode, the host program makes the conditional interrupt "pending" and posts the interrupt to the target logical processor. In such case, in step 560 the target logical processor determines whether it has access to the target address space. When the target logical processor does not have access, the target logical processor signals back to the requesting logical processor that the target logical processor does not have access to the target address space. Otherwise, when the target logical processor does have access to the target address space, the target logical processor relinquishes its access. The target logical processor then also signals back to the requesting logical processor indicating that the target logical processor does not have access to the target address space.

In another case, in step 540 it sometimes occurs that even when the target logical processor is not running, the host program cannot determine from checking the second information whether or not the target logical processor has access to the address space. The host program is unable to determine the target logical processor's access when one or more of the additional conditions described above with reference to step 440 of FIG. 4 are true such as, for example, when the target logical processor is in a stopped state or wait state. In such case, the above-described step 560 is performed, in which the host program posts the interrupt to the target logical processor and causes the target logical processor to become running (to enter interpretive execution mode) it necessary. As described above, the interrupt causes the target logical processor to check whether it currently has access to the target address space, and if so, to cancel its access thereto. In any case, once the target logical processor has completed handling the interrupt, the target logical processor signals back to the requesting logical processor that the target logical processor then does not have access to the target address space.

Figure 5:
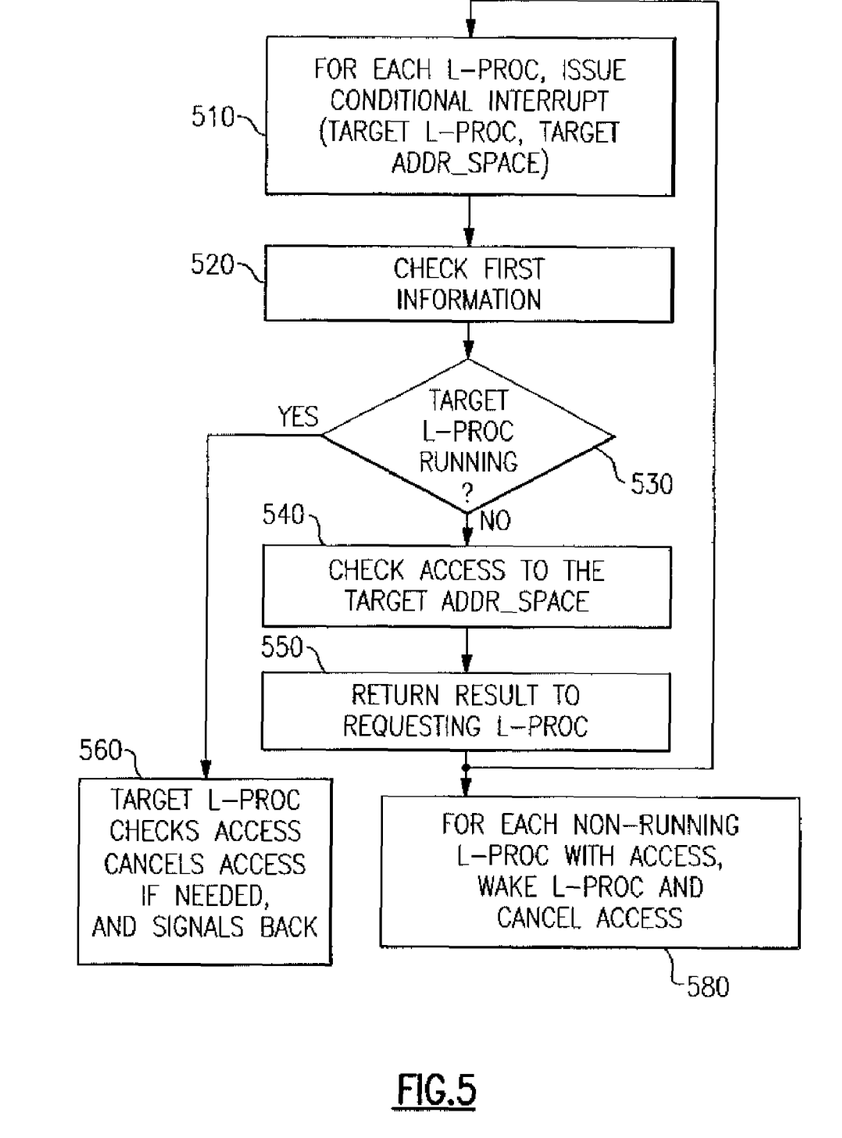
FIG. 5 is a flowchart illustrating a method of eliminating access to a target address space by a plurality of logical processors in accordance with an embodiment of the invention.

By the performance of the method illustrated with respect to FIG. 5, a requesting logical processor can cause the logical processors of a particular set or system configuration to relinquish their access with respect to a target address space. Such method operates efficiently by not requiring non-running logical processors to become running, i.e., to enter interpretive execution mode, unless they are already determined to have access to the target address space or unless a host program cannot determine whether they have access to the target address space. In this way, throughput on systems having relatively large numbers of logical processors is enhanced by avoiding steps required for many logical processors to enter and exit running state, i.e., to enter and exit interpretive execution mode.

While the invention has been described in accordance with certain preferred embodiments thereof, many modifications and enhancements can be made thereto without departing from the true scope and spirit of the invention, which is limited only by the claims appended below.

What is claimed is:

1. A method of determining whether a logical processor of an electronic information processing system has access to an address space of the information processing system, comprising:
   a) executing at least an operating system program by a processor of the information processing system to allocate a plurality of address spaces within a total address space of the information processing system to a plurality of logical processors of the information processing system, each address space having a size and a position within the total address space defined by a range of addresses which is subject to vary as a result of execution of the operating system program;
   b) issuing an instruction by a first processor of an electronic information processing system, the instruction referencing a target logical processor of the plurality of logical processors and a target address space of the plurality of address spaces;
   c) in response to the instruction, checking first information by the information processing system to determine whether the target logical processor is running; and
   d) when it is determined that the target logical processor is not running, checking second information by a host program of the information processing system to determine whether the target logical processor has access to the target address space, wherein when it is determined that the target logical processor is running, returning a result by the host program to the first processor that it is not known whether the target logical processor has access to the target address space and posting an interrupt to the target logical processor requiring the target logical processor to relinquish its access to the target address space.

2. The method as claimed in claim 1, further comprising indicating the result of checking the first and second information by the host program to the first processor.

3. The method as claimed in claim 1, wherein when the result of checking the second information is that the target logical processor does not have access to the target address space, indicating such result by the host program to the first processor.

4. The method as claimed in claim 1, wherein the instruction is a request to perform a conditional interrupt.

5. A method of determining whether a logical processor of an electronic information processing system has access to an address space of the information processing system, comprising:
   a) executing at least an operating system program by a processor of the information processing system to allocate a plurality of address spaces within a total address space of the information Processing system to a plurality of logical processors of the information processing system, each address space having a size and a position within the total address space defined by a range of addresses which is subject to vary as a result of execution of the operating system program;
   b) issuing an instruction by a first processor of an electronic information processing system, the instruction referencing a target logical processor of the plurality of logical processors and a target address space of the plurality of address spaces;
   c) in response to the instruction checking first information by the information processing system to determine whether the target logical processor is running; and
   d) when it is determined that the target logical processor is not running, checking second information by a host program of the information processing system to determine whether the target logical processor has access to the target address space; and, wherein the target logical processor is a first target logical processor, the method further comprising
   e) eliminating access of a plurality of target logical processors including the target logical processor to the target address space, including performing the steps a) through c) with respect to each of the plurality of target logical processors, and when it is determined that any one of the plurality of target logical processors has access to the target address space and is running, causing such target logical processor which is running to relinquish access to the target address space, and when it is determined that any one of the target logical processors has access to the target address space and is not running, waking any such target logical processor which has access to the target address space and causing such waked target logical processor to relinquish access to the target address space.

6. A method of determining whether a logical processor of an electronic information processing system has access to an address space of the information processing system, comprising:
   a) executing at least an operating system program by a processor of the information processing system to allocate a plurality of address spaces within a total address space of the information processing system to a plurality of logical processors of the information processing system, each address space having a size and a position within the total address space defined by a range of addresses which is subject to vary as a result of execution of the operating system program;
   b) issuing an instruction by a first processor of an electronic information processing system, the instruction referencing a target logical processor of the plurality of logical processors and a target address space of the plurality of address spaces;
   c) in response to the instruction, checking first information by the information processing system to determine whether the target logical processor is running; and
   d) when it is determined that the target logical processor is not running, checking second information by a host program of the information processing system to determine whether the target logical processor has access to the target address space; and
   e) checking whether the target logical processor is disabled for interrupts and when the result of checking is that the target logical processor is disabled for interrupts, returning a result by the host program to the first processor that it is not known whether the target logical processor has access to the target address space and posting an interrupt to the target logical processor requiring the target logical processor to relinquish its access to the target address space.

7. The method as claimed in claim 6, wherein the step of checking whether the target logical processor is disabled for interrupts includes checking whether the target logical processor is disabled for external interrupts and checking whether the target logical processor is disabled for interrupts from an input output ("I/O") system.

8. The method as claimed in claim 6, further comprising checking whether the target logical processor is in a wait state, and when the result of checking is that the target logical processor is in a wait state, returning a result to the first processor that it is not known whether the target logical processor has access to the target address space and posting an interrupt to the target logical processor requiring the target logical processor to relinquish its access to the target address space.

9. The method as claimed in claim 8, further comprising checking program status word information to determine whether an instruction address thereof is not zero, and when the result of checking is that the instruction address is not zero, returning a result to the first processor that it is not known whether the target logical processor has access to the target address space and posting an interrupt to the target logical processor requiring the target logical processor to relinquish its access to the target address space.

10. An electronic information processing system, comprising:
   a processor; and
   instructions executable by the processor to perform a method of determining whether a logical processor of has access to an address space of the information processing system, the method including:
   a) executing at least an operating system program by a processor of the information processing system to allocate a plurality of address spaces within a total address space of the information processing system to a plurality of logical processors of the information processing system, each address space having a size and a position within the total address space defined by a range of addresses which is subject to vary as a result of execution of the operating system program;
   b) issuing an instruction by a first processor of an electronic information processing system, the instruction referencing a target logical processor of the plurality of logical processors and a target address space of the plurality of address spaces;
   c) in response to the instruction, checking first information by the information processing system to determine whether the target logical processor is running; and
   d) when it is determined that the target logical processor is not running, checking second information by a host program of the information processing system to determine whether the target logical processor has access to the target address space, wherein when it is determined that the target logical processor is running, returning a result by the host program to the first processor that it is not known whether the target logical processor has access to the target address space and posting an interrupt to the target logical processor requiring the target logical processor to relinquish its access to the target address space.

11. The electronic information processing system as claimed in claim 10, wherein the instruction is a request to perform a conditional interrupt.

12. The electronic information processing system as claimed in claim 10, wherein the method further includes indicating the result of checking the first and second information by the host program to the first processor.

13. The electronic information processing system as claimed in claim 10, wherein when the result of checking the second information is that the target logical processor does not have access to the target address space, the method includes indicating such result by the host program to the first processor.

14. A computer-readable recording medium having instructions recorded thereon, the instructions being executable by a processor to perform a method of determining whether a logical processor of an electronic information processing system has access to an address space of the information processing system, the method comprising:
   a) executing at least an operating system program by a processor of the information processing system to allocate a plurality of address spaces within a total address space of the information processing system to a plurality of logical processors of the information processing system, each address space having a size and a position within the total address space defined by a range of addresses which is subject to vary as a result of execution of the operating system program;
   b) issuing an instruction by a first processor of an electronic information processing system, the instruction referencing a target logical processor of the plurality of logical processors and a target address space of the plurality of address spaces;
   c) in response to the instruction, checking first information by the information processing system to determine whether the target logical processor is running; and
   d) when it is determined that the target logical processor is not running, checking second information by a host program of the information processing system to determine whether the target logical processor has access to the target address space, wherein when it is determined that the target logical processor is running, returning a result by the host program to the first processor that it is not known whether the target logical processor has access to the target address space and posting an interrupt to the target logical processor requiring the target logical processor to relinquish its access to the target address space.

15. The computer-readable recording medium as claimed in claim 14, wherein the instruction is a request to perform a conditional interrupt.

16. The computer-readable recording medium as claimed in claim 14, wherein the method further includes indicating the result of checking the first and second information by the host program to the first processor.

17. The computer-readable recording medium as claimed in claim 14, wherein when the result of checking the second information is that the target logical processor does not have access to the target address space, the method includes indicating such result by the host program to the first processor.

* * * * *